(12) United States Patent
Huang

(10) Patent No.: US 10,555,183 B2
(45) Date of Patent: Feb. 4, 2020

(54) ACCESS METHOD, AUXILIARY ACCESS METHOD, AND APPARATUSES THEREOF

(71) Applicant: Beijing Zhigu Rui Tuo Tech Co., Ltd., Beijing (CN)

(72) Inventor: Weicai Huang, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 0 days.

(21) Appl. No.: 15/378,392

(22) Filed: Dec. 14, 2016

(65) Prior Publication Data

US 2017/0188243 A1     Jun. 29, 2017

(30) Foreign Application Priority Data

Dec. 24, 2015   (CN) .......................... 2015 1 0984624

(51) Int. Cl.
| | |
|---|---|
| *H04W 40/06* | (2009.01) |
| *H04W 74/08* | (2009.01) |
| *H04W 16/28* | (2009.01) |
| *H04W 48/14* | (2009.01) |

(52) U.S. Cl.
CPC .......... *H04W 16/28* (2013.01); *H04W 48/14* (2013.01)

(58) Field of Classification Search
CPC ............ H04W 4/00–046; H04B 7/024; H04B 7/0413; H04B 7/0452; H04B 7/0495
See application file for complete search history.

(56) References Cited

U.S. PATENT DOCUMENTS

| | | | | |
|---|---|---|---|---|
| 6,542,519 | B1* | 4/2003 | Almqvist | H01Q 1/246 370/480 |
| 2003/0133426 | A1* | 7/2003 | Schein | H04W 74/006 370/337 |
| 2004/0214606 | A1* | 10/2004 | Wichman | H04B 7/0408 455/562.1 |
| 2005/0206564 | A1* | 9/2005 | Mao | H01Q 3/2605 342/377 |
| 2008/0303718 | A1* | 12/2008 | Chiang | H01Q 3/40 342/373 |
| 2013/0023278 | A1* | 1/2013 | Chin | H04W 64/00 455/456.1 |

FOREIGN PATENT DOCUMENTS

| | | |
|---|---|---|
| CN | 101505205 A | 8/2009 |
| CN | 104349444 A | 2/2015 |

* cited by examiner

*Primary Examiner* — San Htun
(74) *Attorney, Agent, or Firm* — Sheppard Mullin Richter & Hampton LLP

(57) ABSTRACT

The embodiments of this application disclose an access method, an auxiliary access method, and apparatuses thereof. The access method comprises: receiving an access-associated signal from at least one path, wherein the access-associated signal is separately sent by an access point device by using at least two non-coherent antennas; and sending an access request in at least one Direction of Arrival of access-associated signals corresponding to some antennas of the at least two non-coherent antennas. According to the method and the apparatus in the embodiments of this application, an access request is sent in at least one Direction of Arrival of access-associated signals corresponding to some antennas of an access point device, which can reduce a probability of a collision between access terminals and improve an access success rate of an access terminal.

14 Claims, 6 Drawing Sheets

S120 — Receive an access-associated signal from at least one path

S140 — Send an access request in at least one Direction of Arrival of access-associated signals corresponding to some antennas of at least two non-coherent antennas

ACCESS METHOD, AUXILIARY ACCESS METHOD, AND APPARATUSES THEREOF

CROSS REFERENCE TO RELATED APPLICATION

The present application is based on and claims the benefit of priority to Chinese Application No. 201510984624.6, filed on Dec. 24, 2015, the entire contents of which are incorporated herein by reference.

TECHNICAL FIELD

This application relates to the field of smart antenna technologies, and in particular, to an access method, an auxiliary access method, and apparatuses thereof.

BACKGROUND

On a wireless communications network, a random access conflict is unavoidable. To alleviate a random access conflict and improve an access success rate and an access speed, in a manner, more access channel resources are provided. However, as more access channel resources are allocated, resources of other channels (for example, a service channel) are sacrificed; therefore, access channel resources cannot be increased unrestrictedly.

As the fifth-generation mobile communication (5G) era begins and the Internet of Things is widely deployed, there are more mobile terminals than ever and it is more difficult to predict time distribution of random access. As a result, an access success rate and access channel resource allocation become increasingly contradictory.

SUMMARY

In view of this, an objective of embodiments of this application is to provide an access solution that can effectively reduce random access conflicts.

To achieve the foregoing objective, according to a first aspect of the embodiments of this application, an access method is provided, wherein the method comprises:

receiving an access-associated signal from at least one path, wherein the access-associated signal is separately sent by an access point device by using at least two non-coherent antennas; and sending an access request in at least one Direction of Arrival of access-associated signals corresponding to some antennas of the at least two non-coherent antennas.

According to a second aspect of the embodiments of this application, an auxiliary access method is provided, wherein the method comprises:

sending at least two access-associated signals by using at least two non-coherent antennas; and receiving at least one access request.

According to a third aspect of this application, an access apparatus is provided, wherein the apparatus comprises:

a first receiving module, configured to receive an access-associated signal from at least one path, wherein the access-associated signal is separately sent by an access point device by using at least two non-coherent antennas; and a first sending module, configured to send an access request in at least one Direction of Arrival of access-associated signals corresponding to some antennas of the at least two non-coherent antennas.

According to a fourth aspect of this application, an auxiliary access apparatus is provided, wherein the apparatus comprises:

a second sending module, configured to send at least two access-associated signals by using at least two non-coherent antennas; and a second receiving module, configured to receive at least one access request.

According to a fifth aspect of this application, an access apparatus is provided, wherein the apparatus comprises:

a transceiver;

a memory, configured to store an instruction; and a processor, configured to execute the instruction stored by the memory, wherein the instruction enables the processor to perform the following steps:

receiving an access-associated signal from at least one path by using the transceiver, wherein the access-associated signal is separately sent by an access point device by using at least two non-coherent antennas; and sending, by using the transceiver, an access request in at least one Direction of Arrival of access-associated signals corresponding to some antennas of the at least two non-coherent antennas.

According to a sixth aspect of this application, an auxiliary access apparatus is provided, wherein the apparatus comprises:

a transceiver;

a memory, configured to store an instruction; and a processor, configured to execute the instruction stored by the memory, wherein the instruction enables the processor to perform the following steps:

sending at least two access-associated signals by using at least two non-coherent antennas; and receiving at least one access request by using the transceiver.

According to the method and the apparatus in the embodiments of this application, an access request is sent in at least one Direction of Arrival of access-associated signals corresponding to some antennas of an access point device, which can reduce a probability of a collision between access terminals and improve an access success rate of an access terminal.

DETAILED DESCRIPTION

Figure 1:
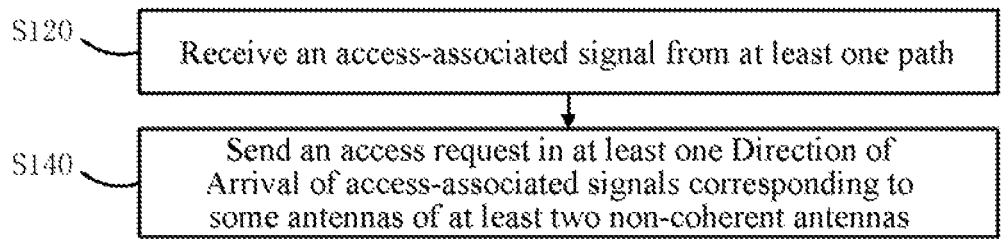
FIG. 1 is an exemplary flowchart of an access method according to an embodiment of this application.

Specific implementation manners of the present application are further described in detail with reference to accompanying drawings and embodiments. The following embodi ments are used to describe the present invention, but are not intended to limit the scope of the present invention.

A person skilled in the art may understand that terminologies such as "first" and "second" in this application are used only to distinguish different devices, modules, parameters, and the like; and indicates neither a particular technical meaning nor an inevitable logical sequence.

In the following description of this application, terminologies "system" and "network" may usually be exchanged. For the purpose of clear description, in the following description of the embodiments of this application, some aspects of the technical solutions of this application are described by using an LTE (Long Term Evolution, Long Term Evolution) system as an example, and LTE-A terminologies are used in most following descriptions. However, the technical solutions of this application are not limited thereto, and are also applicable to, for example, CDMA (Code Division Multiple Access, Code Division Multiple Access), TDMA (Time Division Multiple Access, Time Division Multiple Access), FDMA (Frequency Division Multiple Access, Frequency Division Multiple Access), and OFDMA (Orthogonal Frequency Division Multiple Access, Orthogonal Frequency Division Multiple Access). Terminologies associated with different technologies may vary. For example, based on different technologies, an "access point (AP)" may comprise, or may be implemented as, or may be referred to as a node B, an evolved node B (eNode B), a radio network controller (RNC), a base station controller (BSC), a base transceiver station (BTS), a base station (BS), a transmitter function (TF), a radio router, a radio transceiver, a basic service set (BSS), an extended service set (ESS), a radio base station (RBS), or other terminologies. An "access terminal (AT)" may comprise, or may be implemented as, or may be referred to as an access terminal, customer-premises equipment, a subscriber unit, a mobile station, a remote station, a remote terminal, a user terminal, a user agent, a user apparatus, user equipment, a subscriber station, or other terminologies. In some implementation manners, an access terminal may comprise a cellular phone, a Session Initiation Protocol (SIP) phone, a wireless local loop (WLL) station, a personal digital assistant (PDA), a handheld device having a wireless connection capability, a station (STA), or another possible device connected to a wireless modem. In an LTE system, an access terminal may be referred to as "user equipment (UE)".

In the embodiments of this application, a smart antenna may be configured in both an access point and an access terminal. A smart antenna is also referred to as an adaptive antenna array, a variable antenna array, a multi-antenna, or the like, and has a capability of adjusting sending and/or receiving according to a Direction of Arrival (Direction of Arrival, DOA) of a received signal.

FIG. 1 is an exemplary flowchart of an access method according to an embodiment of this application. This method may be executed by any access terminal. As shown in FIG. 1, the method comprises:

S120. Receive an access-associated signal from at least one path, wherein the access-associated signal is separately sent by an access point device by using at least two non-coherent antennas.

In methods of the embodiments of this application, the terminology "coherence" refers to correlation between signals transmitted by two different antennas, and the correlation refers to a property of association relative to a particular physical quantity, for example, phases of signals transmitted by two different antennas are correlated. Two "non-coherent antennas" refer to that signals transmitted by these two antennas are uncorrelated. In the method of this embodiment, the at least two non-coherent antennas are configured to transmit at least two access-associated signals in a non-coherent manner. In a possible implementation manner, each antenna of the at least two non-coherent antennas may consist of one physical antenna array element, and in this case, any two non-coherent antennas may refer to any two array elements between which spacing is greater than 0.5 wavelength. Alternatively, each antenna of the at least two non-coherent antennas may consist of multiple physical antenna array elements, and in this case, two antenna array element groups that two non-coherent antennas consist of transmit access-associated signals in a non-coherent manner, for example, may separately transmit directional beams in a beamforming manner, wherein the directional beams transmitted by the two array element groups are uncorrelated.

Moreover, in the access method of this embodiment of this application, the access-associated signal is any signal that may be used by the access terminal to determine an access target and access the target, for example, a cell-specific reference signal (CRS) or a cell synchronization signal that is periodically sent by a base station. It should be noted that, in the method of this embodiment, although the access point device separately sends the at least two access-associated signals by using the at least two non-coherent antennas, information carried in the access-associated signals sent by the different antennas is all associated with the access point device and are therefore the same.

In step S120, some or all of the at least two access-associated signals sent by the access point device by using the at least two non-coherent antennas are received.

S140. Send an access request in at least one Direction of Arrival of access-associated signals corresponding to some antennas of the at least two non-coherent antennas.

The access request may be any information used by the access terminal to initiate an access process, for example, a random access preamble sent by a user equipment to a node B in an LTE system.

For any access-associated signal, regardless of how many transmission paths that the access-associated signal passes through to reach the access terminal, based on channel reciprocity, the access terminal transmits, in an incident direction of a received access-associated signal of any path, the access request whose carrier frequency is approximate to that of the access-associated signal, and returns, according to the path, the access request to an antenna corresponding to the access-associated signal. On this basis, in the method of this embodiment of this application, to reduce a probability of colliding, on a same antenna, with an access request sent by another access terminal, the access terminal that executes the method of this embodiment sends the access request in at least one Direction of Arrival of access-associated signals corresponding to some antennas of the at least two non-coherent antennas.

Specifically, in a possible implementation manner, the access-associated signal from the at least one path that is received by the access terminal may comprise an access-associated signal from one or more (comprising two or more) non-coherent antennas. If antennas corresponding to signals of various paths cannot be distinguished, it is chosen to send the access request in Directions of Arrival corresponding to some (less than a quantity of paths corresponding to received signals) paths, which can reduce a probability that the access request is sent to all the two non-coherent antennas, and therefore reduce a probability of colliding with an access request of another access terminal. If antennas corresponding to signals of various paths cannot be distinguished, the access request is sent on some or all paths corresponding to some (less than a quantity of antennas corresponding to received access-associated signals) antennas, which can also avoid that the access request is sent to all the two non-coherent antennas, and therefore reduce a probability of colliding with an access request of another access terminal.

In conclusion, according to the method in this embodiment, an access request is sent in at least one Direction of Arrival of access-associated signals corresponding to some antennas of an access point device, which can reduce a probability of a collision between access terminals and improve an access success rate of an access terminal.

In a possible implementation manner, the method of this embodiment further comprises:

S130. Determine the at least one Direction of Arrival of the received access-associated signal from the at least one path.

In a possible implementation manner, the access terminal may be a device having a smart antenna, and can determine a Direction of Arrival of each received signal according to the received signal by using the smart antenna, wherein the smart antenna can determine a Direction of Arrival of a received signal according to any suitable algorithm, for example, an MUSIC algorithm or an ESPRIT algorithm.

Moreover, regardless of whether the access terminal can distinguish antennas corresponding to received access-associated signals, the access terminal chooses to transmit the access request in any one of Directions of Arrival of received access-associated signals, which can achieve an objective of sending an access request in at least one Direction of Arrival of access-associated signals corresponding to some antennas of the at least two non-coherent antennas. That is, in a possible implementation manner, step S140 may comprise:

S141. Send the access request in any Direction of Arrival of the at least one Direction of Arrival of the access-associated signal from the at least one path.

In a possible implementation manner, the Direction of Arrival may be randomly determined, and then, the access request is sent in the any Direction of Arrival. Randomness refers to that, for determining of the any Direction of Arrival, a probability that each Direction of Arrival is determined as the "any Direction of Arrival" (for example, a particular quantity of access processes) is determinate in a particular range.

In another possible implementation manner, the at least one Direction of Arrival may be determined in step S140 by means of polling. Specifically, to reduce a probability of colliding with an access request sent by another access terminal, in the method of this embodiment, in an access process, at least one Direction of Arrival may be selected, and in another access process, at least one Direction of Arrival different from a previous Direction of Arrival is selected as much as possible. In this case, step S140 may further comprise:

S142. Determine at least one target Direction of Arrival in the at least one Direction of Arrival of the access-associated signal from the at least one path according to at least access history information.

S143. Send the access request in the at least one target Direction of Arrival.

In this case, an apparatus that executes the method of this embodiment may acquire locally or externally the access history information associated with a sending direction corresponding to the access request, and in step S142, the apparatus selects, as much as possible according to the access history information, at least one Direction of Arrival different from previous one or more Directions of Arrival, to send the access request.

In another possible implementation manner, to implement better access, the at least one Direction of Arrival may be determined in step S140 according to power of a received signal. In this case, step S140 may further comprise:

S144. Determine at least one target Direction of Arrival according to at least received signal power of the received access-associated signal from the at least one path.

S145. Send the access request in the at least one target Direction of Arrival.

For example, the access request is sent in a Direction of Arrival corresponding to one or more signals having the highest received signal power.

In another possible implementation manner, to implement better access, the at least one Direction of Arrival may be determined in step S140 according to a signal receiving delay. In this case, step S140 may further comprise:

S146. Determine at least one target Direction of Arrival according to at least a signal receiving delay of the received access-associated signal from the at least one path.

S147. Send the access request in the at least one target Direction of Arrival.

For example, the access request is sent in a Direction of Arrival corresponding to one or more signals having the smallest signal receiving delay.

Both the received signal power and the signal receiving delay may be calculated by a smart antenna. In a possible implementation manner, a smart antenna may obtain a power delay profile (Power Delay Profile, PDP) diagram of a receive antenna, that is, a profile showing that power of each path is different together with an incident angle, and may determine the received signal power, the receive signal, and/or a Direction of Arrival according to the profile diagram.

Still as described above, for a same access point device, information streams carried in access reference signals sent by non-coherent antennas are the same, but different spread spectrum modulations may be performed. In this case, in the method of this embodiment, access-associated signals sent by different antennas may be distinguished by using spread spectrum signal characteristics of the received signals. In this case, step S140 may further comprise:

S148. Determine, according to at least a spread spectrum signal characteristic (for example, a characteristic waveform) of the received access-associated signal from the at least one path, an antenna corresponding to the received access-associated signal from the at least one path.

S149. Send the access request in at least one Direction of Arrival corresponding to at least one antenna of the at least two antennas.

It should be noted that, in the method of this embodiment, the at least one Direction of Arrival in which the access request is sent may be further determined by comprehensively considering various foregoing factors. For example, received signal power and a history access request are comprehensively considered, and a Direction of Arrival that has the highest received signal power and that is of directions that were not used.

In conclusion, in the method of this embodiment, a sending direction of the access request may be determined according to multiple criteria, and better access can be implemented while a probability of colliding with another access terminal is reduced.

Figure 2:
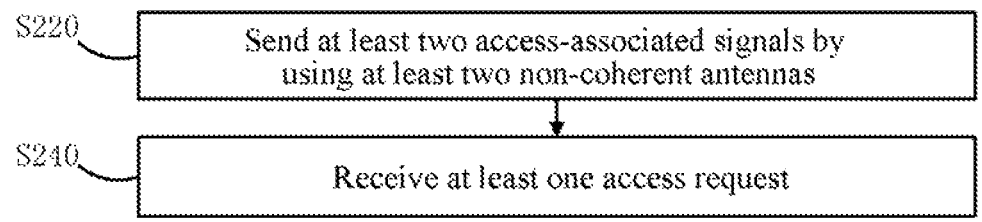
FIG. 2 is an exemplary flowchart of an auxiliary access method according to an embodiment of this application.

FIG. 2 is an exemplary flowchart of an auxiliary access method according to an embodiment. This method may be executed by any access point device. As shown in FIG. 2, the method comprises:

S220. Send at least two access-associated signals by using at least two non-coherent antennas.

For example, as shown in FIG. 1, the access-associated signal may be any signal that may be used by the access terminal to determine an access target and access the target, for example, a cell-specific reference signal (CRS) or a cell synchronization signal that is periodically sent by a base station. It should be noted that, in the method of this embodiment, although the at least two access-associated signals are separately sent by using the at least two non-coherent antennas in step S220, information carried in the access-associated signals sent by the different antennas is all associated with the access point device and are therefore the same.

Moreover, in the method of this embodiment, the access point device may determine in any suitable manner the at least two non-coherent antennas used to send the access-associated signals, for example, may select at least two physical antenna array elements spacing between which is greater than 0.5 wavelength; or the access point device may determine the at least two non-coherent antennas by using any suitable a non-coherent antenna selection (NON-AS) algorithm.

S240. Receive at least one access request, wherein the access request may be any information used by the access terminal to initiate an access process, for example, a random access preamble sent by a user equipment to a node B in an LTE system.

In the method of this embodiment, the access request is sent in at least one Direction of Arrival of access-associated signals corresponding to some antennas of the at least two non-coherent antennas. Therefore, possibility of a conflict between access terminals has reduced, but load of different antennas may be unbalanced within a particular period. In this case, the method of this embodiment may further comprise a step of adjusting load of antennas.

Specifically, in a possible implementation manner, the method of this embodiment may further comprise:

S262. Determine a quantity of access requests received within a preset time by using the at least two non-coherent antennas.

S264. Adjust, according to at least the quantity, transmit power used by the at least two non-coherent antennas to send an access-associated signal.

By adjusting transmit power, it is less possible for the access terminal to select, as a receive end of the access request, an antenna whose transmit power is reduced; therefore, a probability that another antenna receives the access request increases.

In another possible implementation manner, the method of this embodiment may further comprise:

S262'. Determine a quantity of access requests received within a preset time by using the at least two non-coherent antennas.

S264'. Adjust, according to at least the quantity, a transmission interval at which an access-associated signal is sent by using the at least two non-coherent antennas.

By adjusting a transmit interval to increase a transmit interval of an antenna, it is less possible for the access terminal to select the antenna as a receive end of the access request; therefore, a probability that another antenna receives the access request increases.

A person skilled in the art can understand that sequence numbers of the steps in the foregoing method in the specific implementation manners of this application do not mean execution sequences. The execution sequences of the steps should be determined according to functions and internal logic of the steps, and should not be construed as any limitation on the implementation processes of the specific implementation manners of this application.

In addition, an embodiment of this application further provides a computer readable medium, which comprises a computer readable instruction that performs the following operations when being executed: executing the operations of the steps of the method in the implementation manner shown in FIG. 1.

In addition, an embodiment of this application further provides a computer readable medium, which comprises a computer readable instruction that performs the following operations when being executed: executing the operations of the steps of the method in the implementation manner shown in FIG. 2.

Figure 3A:
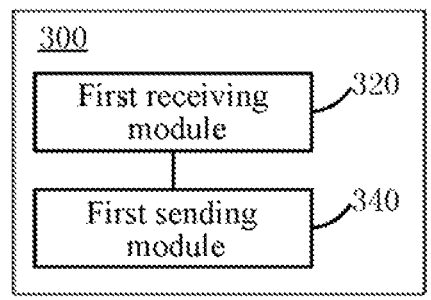
FIGS. 3A-3F are multiple exemplary block diagrams of an access apparatus according to an embodiment of this application.

FIG. 3A is an exemplary block diagram of an access apparatus according to an embodiment of this application. The apparatus 300 may be or may belong to any access terminal. As shown in FIG. 3A, the apparatus 300 comprises: a first receiving module 320 and a first sending module 340.

The first receiving module 320 is configured to receive an access-associated signal from at least one path, wherein the access-associated signal is separately sent by an access point device by using at least two non-coherent antennas.

In apparatuses of the embodiments of this application, the terminology "coherence" refers to correlation between signals transmitted by two different antennas, and the correlation refers to a property of association relative to a particular physical quantity, for example, phases of signals transmitted by two different antennas are correlated. Two "non-coherent antennas" refer to that signals transmitted by these two antennas are uncorrelated. In the method of this embodiment, the at least two non-coherent antennas are configured to transmit at least two access-associated signals in a non-coherent manner. In a possible implementation manner, each antenna of the at least two non-coherent antennas may consist of one physical antenna array element, and in this case, any two non-coherent antennas may refer to any two array elements between which spacing is greater than 0.5 wavelength. Alternatively, each antenna of the at least two non-coherent antennas may consist of multiple physical antenna array elements, and in this case, two antenna array element groups that two non-coherent antennas consist of transmit access-associated signals in a non-coherent manner, for example, may separately transmit directional beams in a beamforming manner, wherein the directional beams transmitted by the two array element groups are uncorrelated.

Moreover, in the access apparatus of this embodiment of this application, the access-associated signal is any signal that may be used by the access terminal to determine an access target and access the target, for example, a cell-specific reference signal (CRS) or a cell synchronization signal that is periodically sent by a base station. It should be noted that, in the method of this embodiment, although the access point device separately sends the at least two access-associated signals by using the at least two non-coherent antennas, information carried in the access-associated signals sent by the different antennas is all associated with the access point device and are therefore the same.

The first receiving module 320 receive some or all of the at least two access-associated signals sent by the access point device by using the at least two non-coherent antennas.

The first sending module 340 is configured to send an access request in at least one Direction of Arrival of access-associated signals corresponding to some antennas of the at least two non-coherent antennas. The access request may be any information used by the access terminal to initiate an access process, for example, a random access preamble sent by a user equipment to a node B in an LTE system.

For any access-associated signal, regardless of how many transmission paths that the access-associated signal passes through to reach the access terminal, based on channel reciprocity, the access terminal transmits, in an incident direction of a received access-associated signal of any path, the access request whose carrier frequency is approximate to that of the access-associated signal, and returns, according to the path, the access request to an antenna corresponding to the access-associated signal. On this basis, in the apparatus of this embodiment of this application, to reduce a probability of colliding, on a same antenna, with an access request sent by another access terminal, the apparatus of this embodiment sends the access request in at least one Direction of Arrival of access-associated signals corresponding to some antennas of the at least two non-coherent antennas.

Specifically, in a possible implementation manner, the access-associated signal from the at least one path that is received by the first receiving module 320 may comprise an access-associated signal from one or more (comprising two or more) non-coherent antennas. If antennas corresponding to signals of various paths cannot be distinguished, the first sending module 340 chooses to send the access request in Directions of Arrival corresponding to some (less than a quantity of paths corresponding to received signals) paths, which can reduce a probability that the access request is sent to all the two non-coherent antennas, and therefore reduce a probability of colliding with an access request of another access terminal. If antennas corresponding to signals of various paths cannot be distinguished, the first sending module 340 sends the access request on some or all paths corresponding to some (less than a quantity of antennas corresponding to received access-associated signals) antennas, which can also avoid that the access request is sent to all the two non-coherent antennas, and therefore reduce a probability of colliding with an access request of another access terminal.

In conclusion, according to the apparatus in this embodiment, an access request is sent in at least one Direction of Arrival of access-associated signals corresponding to some antennas of an access point device, which can reduce a probability of a collision between access terminals and improve an access success rate of an access terminal.

Figure 3B:
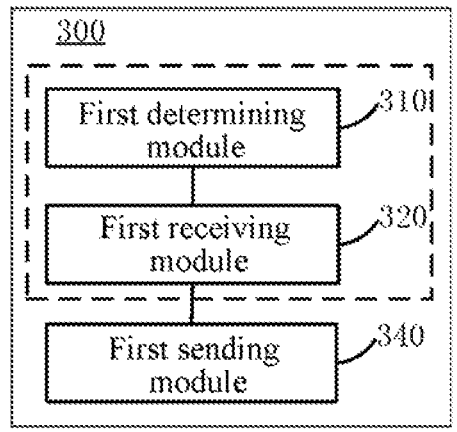

In a possible implementation manner, as shown in FIG. 3B, the apparatus of this embodiment further comprises:

a first determining module 310, configured to determine the at least one Direction of Arrival of the received access-associated signal from the at least one path.

In a possible implementation manner, the access terminal may be a device having a smart antenna, that is, the first receiving module 320 is or comprises the smart antenna, and can determine a Direction of Arrival of each received signal according to the received signal by using the smart antenna, wherein the smart antenna can determine a Direction of Arrival of a received signal according to any suitable algorithm, for example, an MUSIC algorithm or an ESPRIT algorithm. In this implementation manner, the first determining module 310 and the first receiving module 320 are a same module.

Moreover, regardless of whether the access terminal can distinguish antennas corresponding to received access-associated signals, the access terminal chooses to transmit the access request in any one of Directions of Arrival of received access-associated signals, which can achieve an objective of sending an access request in at least one Direction of Arrival of access-associated signals corresponding to some antennas of the at least two non-coherent antennas. That is, in a possible implementation manner, the first sending module 340 may be configured to send the access request in any Direction of Arrival of the at least one Direction of Arrival of the access-associated signal from the at least one path.

In a possible implementation manner, the Direction of Arrival may be randomly determined, and then, the access request is sent in the any Direction of Arrival randomly determined. Randomness refers to that, for determining of the any Direction of Arrival, a probability that each Direction of Arrival is determined as the "any Direction of Arrival" (for example, a particular quantity of access processes) is determinate in a particular range.

Figure 3C:
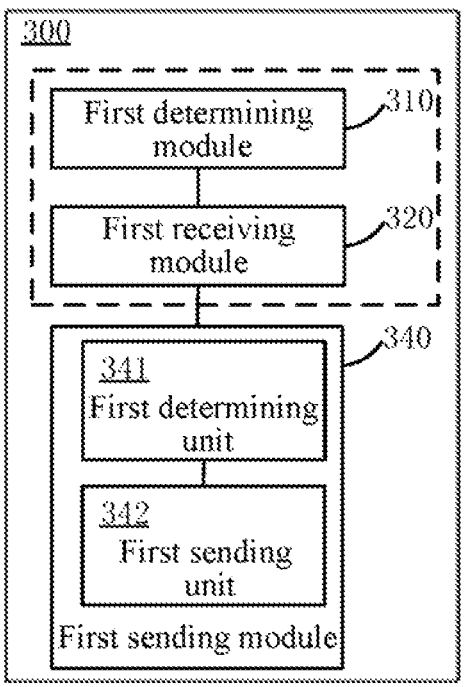

In another possible implementation manner, the first sending module 340 may determine the at least one Direction of Arrival by means of polling. Specifically, to reduce a probability of colliding with an access request sent by another access terminal, in the method of this embodiment, in an access process, at least one Direction of Arrival may be selected, and in another access process, at least one Direction of Arrival different from a previous Direction of Arrival is selected as much as possible. In this case, as shown in FIG. 3C, the first sending module 340 may further comprise:

a first determining unit 341, configured to determine at least one target Direction of Arrival in the at least one Direction of Arrival of the access-associated signal from the at least one path according to at least access history information; and a first sending unit 342, configured to send the access request in the at least one target Direction of Arrival.

In this case, the first determining unit 341 may acquire locally or externally the access history information associated with a sending direction corresponding to the access request, and the first sending unit 342 selects, as much as possible according to the access history information, at least one Direction of Arrival different from previous one or more Directions of Arrival, to send the access request.

Figure 3D:
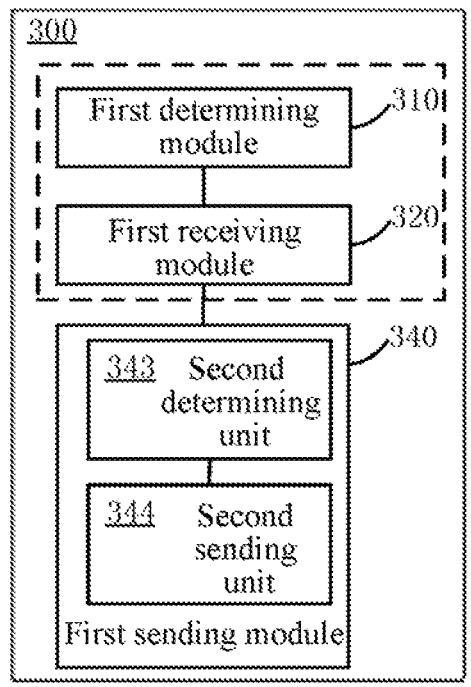

In another possible implementation manner, to implement better access, the first sending module 340 may determine the at least one Direction of Arrival according to power of a received signal. In this case, as shown in FIG. 3D, the first sending module 340 may further comprise:

a second determining unit 343, configured to determine at least one target Direction of Arrival according to at least received signal power of the received access-associated signal from the at least one path; and a second sending unit 344, configured to send the access request in the at least one target Direction of Arrival.

For example, the access request is sent in a Direction of Arrival corresponding to one or more signals having the highest received signal power.

Figure 3E:
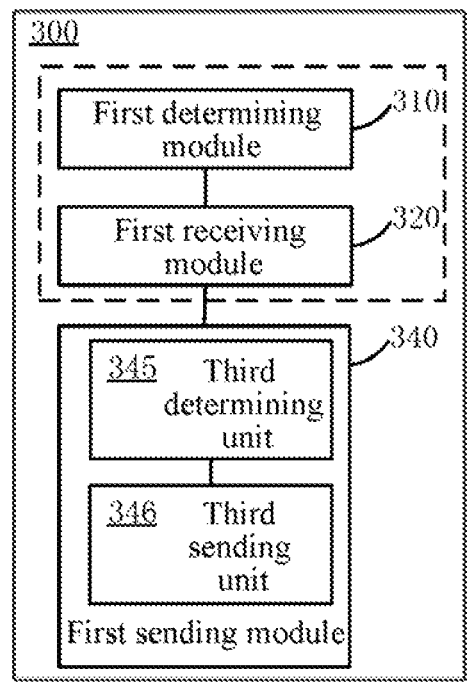

In another possible implementation manner, to implement better access, the first sending module 340 may determine the at least one Direction of Arrival according to a signal receiving delay. In this case, as shown in FIG. 3E, the first sending module 340 may further comprise:

a third determining unit 345, configured to determine at least one target Direction of Arrival according to at least a signal receiving delay of the received access-associated signal from the at least one path; and a third sending unit 346, configured to send the access request in the at least one target Direction of Arrival.

For example, the access request is sent in a Direction of Arrival corresponding to one or more signals having the smallest signal receiving delay.

Both the received signal power and the signal receiving delay may be calculated by a smart antenna. In a possible implementation manner, a smart antenna may obtain a power delay profile (Power Delay Profile, PDP) diagram of a receive antenna, that is, a profile showing that power of each path is different together with an incident angle, and may determine the received signal power, the receive signal, and/or a Direction of Arrival according to the profile diagram.

Figure 3F:
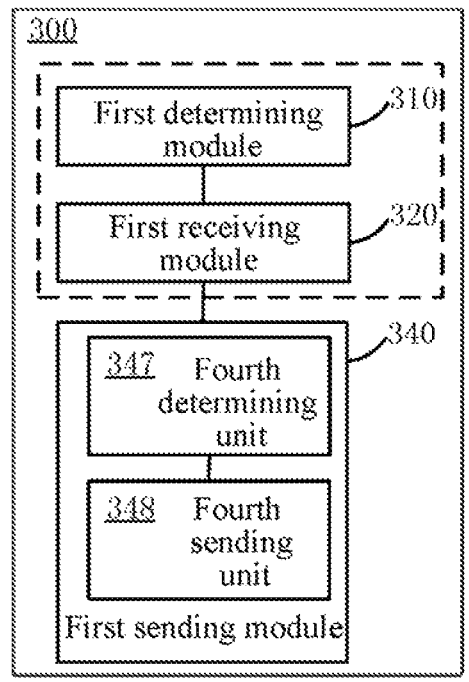

Still as described above, for a same access point device, information streams carried in access reference signals sent by non-coherent antennas are the same, but different spread spectrum modulations may be performed. In this case, in the method of this embodiment, access-associated signals sent by different antennas may be distinguished by using spread spectrum signal characteristics of the received signals. In this case, as shown in FIG. 3F, the first sending module 340 may further comprise:

a fourth determining unit 347, configured to determine, according to at least a spread spectrum signal characteristic (for example, a characteristic waveform) of the received access-associated signal from the at least one path, an antenna corresponding to the received access-associated signal from the at least one path; and a fourth sending unit 348, configured to send the access request in at least one Direction of Arrival corresponding to at least one antenna of the at least two antennas.

It should be noted that, in the apparatus of this embodiment, the at least one Direction of Arrival in which the access request is sent may be further determined by comprehensively considering various foregoing factors. For example, received signal power and a history access request are comprehensively considered, and a Direction of Arrival that has the highest received signal power and that is of directions that were not used.

In conclusion, in the apparatus of this embodiment, a sending direction of the access request may be determined according to multiple criteria, and better access can be implemented while a probability of colliding with another access terminal is reduced.

Figure 4A:
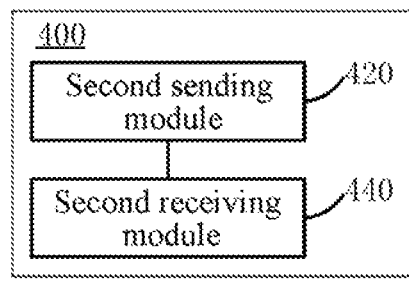
FIGS. 4A and 4B are two exemplary block diagrams of an auxiliary access apparatus according to an embodiment of this application.

FIG. 4A is an exemplary flowchart of an auxiliary access apparatus according to an embodiment. The apparatus 400 may belong to or is any access point device. As shown in FIG. 4A, the apparatus 400 comprises: a second sending module 420 and a second receiving module 440.

The second sending module 420 is configured to send at least two access-associated signals by using at least two non-coherent antennas.

For example, as shown in FIG. 1, the access-associated signal may be any signal that may be used by the access terminal to determine an access target and access the target, for example, a cell-specific reference signal (CRS) or a cell synchronization signal that is periodically sent by a base station. It should be noted that, in the apparatus of this embodiment, although the second sending module 420 separately sends the at least two access-associated signals by using the at least two non-coherent antennas, information carried in the access-associated signals sent by the different antennas is all associated with the access point device and are therefore the same.

Moreover, in the apparatus of this embodiment, the access point device may determine in any suitable manner the at least two non-coherent antennas used to send the access-associated signals, for example, may select at least two physical antenna array elements spacing between which is greater than 0.5 wavelength; or the access point device may determine the at least two non-coherent antennas by using any suitable a non-coherent antenna selection (NON-AS) algorithm.

The second receiving module 440 is configured to receive at least one access request. The access request may be any information used by the access terminal to initiate an access process, for example, a random access preamble sent by a user equipment to a node B in an LTE system.

In the apparatus of this embodiment, the access request is sent in at least one Direction of Arrival of access-associated signals corresponding to some antennas of the at least two non-coherent antennas. Therefore, possibility of a conflict between access terminals has reduced, but load of different antennas may be unbalanced within a particular period. In this case, the apparatus of this embodiment may further comprise a module of adjusting load of antennas.

Figure 4B:
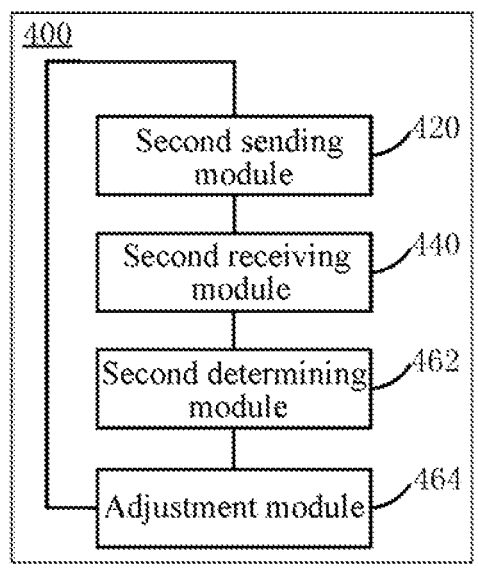

Specifically, in a possible implementation manner, as shown in FIG. 4B, the apparatus of this embodiment further comprises:

a second determining module 462, configured to determine a quantity of access requests received within a preset time by using the at least two non-coherent antennas; and an adjustment module 464, configured to adjust, according to at least the quantity, transmit power used by the at least two non-coherent antennas to send an access-associated signal.

By adjusting transmit power, it is less possible for the access terminal to select, as a receive end of the access request, an antenna whose transmit power is reduced; therefore, a probability that another antenna receives the access request increases.

In another possible implementation manner, the adjustment module 464 may be further configured to adjust, according to at least the quantity, a transmission interval at which an access-associated signal is sent by using the at least two non-coherent antennas.

By adjusting a transmit interval to increase a transmit interval of an antenna, it is less possible for the access terminal to select the antenna as a receive end of the access request; therefore, a probability that another antenna receives the access request increases.

Figure 5:
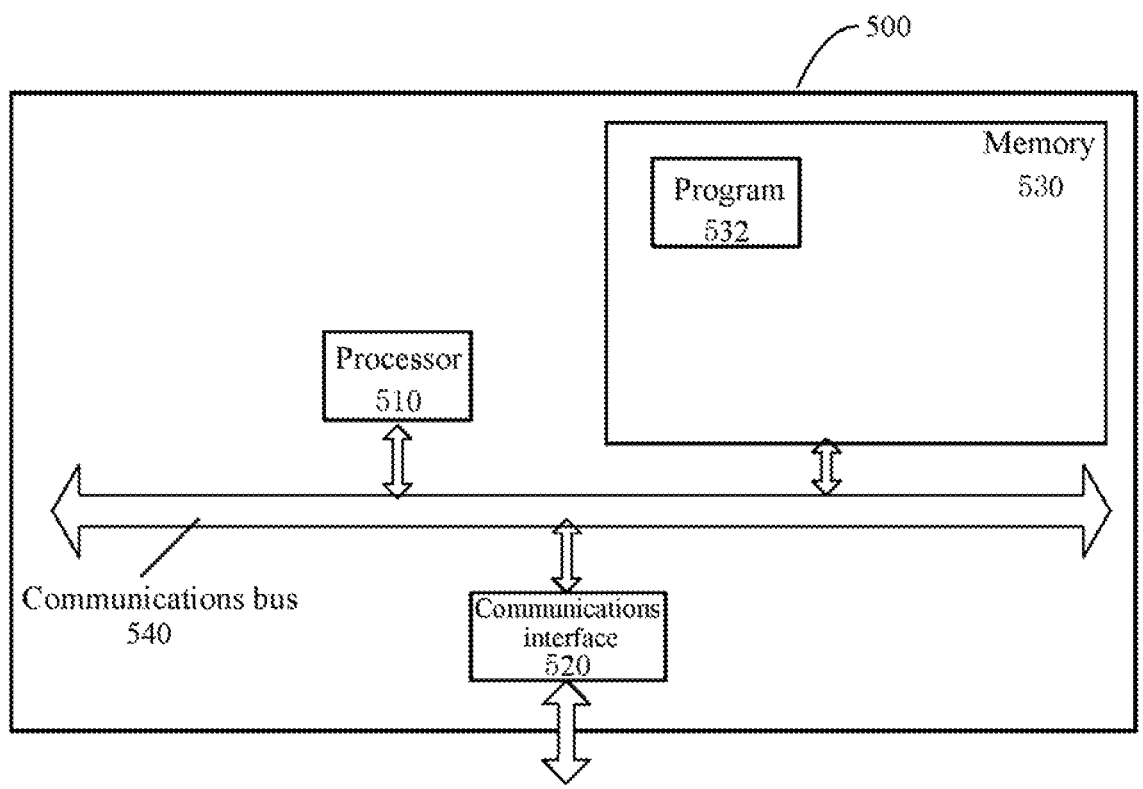
FIG. 5 is another exemplary structural block diagram of an access apparatus according to an embodiment of this application.

FIG. 5 is another exemplary schematic structural diagram of an access apparatus according to an embodiment of this application. This specific embodiment of this application does not limit specific implementation of the access apparatus. As shown in FIG. 5, the access apparatus 500 may comprise:

a processor (processor) 510, a communications interface (Communications Interface) 520, a memory (memory) 530, and a communications bus 540.

The processor 510, the communications interface 520, and the memory 530 communicate with each other by using the communications bus 540.

The communications interface 520 is configured to communicate with a network element, for example, a client.

The processor 510 is configured to execute a program 532, and specifically may perform related steps in the method embodiment in FIG. 1.

Specifically, the program 532 may comprise program code, and the program code comprises a computer operation instruction.

The processor 510 may be a central processing unit CPU, an application specific integrated circuit ASIC (Application Specific Integrated Circuit), or one or more integrated circuits configured to implement the embodiments of this application.

The memory 530 is configured to store the program 532. The memory 530 may comprise a high-speed RAM memory, and may also comprise a non-volatile memory (non-volatile memory), for example, at least one magnetic disk storage. The program 532 may be specifically used to enable the access apparatus 500 to perform the following steps:

receiving an access-associated signal from at least one path, wherein the access-associated signal is separately sent by an access point device by using at least two non-coherent antennas; and sending an access request in at least one Direction of Arrival of access-associated signals corresponding to some antennas of the at least two non-coherent antennas.

For specific implementation of the steps in the program 532, reference may be made to corresponding descriptions of corresponding steps and units in the foregoing embodiments, and details are not described herein. It may be clearly understood by a person skilled in the art that, for the purpose of a convenient and brief description, for specific working processes of the foregoing devices and modules, reference may be made to corresponding process descriptions in the foregoing method embodiment, which are not described herein again.

Figure 6:
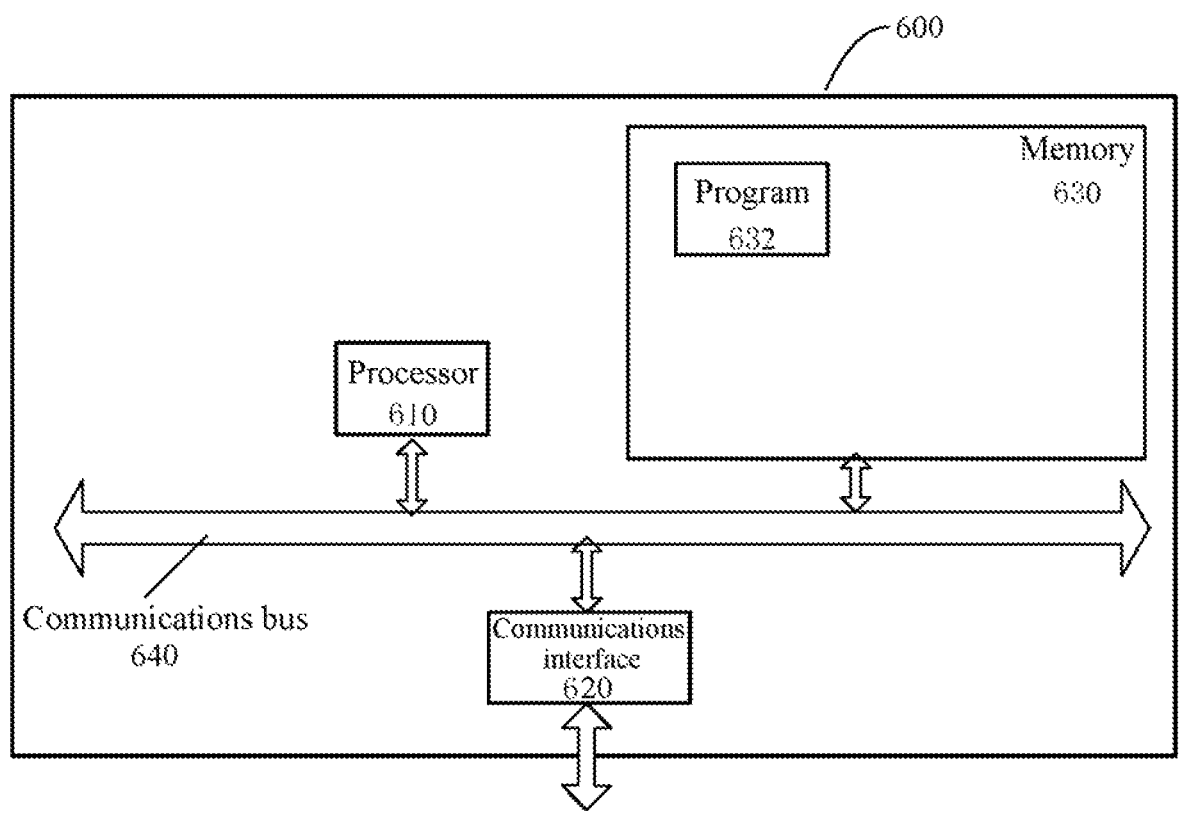
FIG. 6 is another exemplary structural block diagram of an auxiliary access apparatus according to an embodiment of this application.

FIG. 6 is another exemplary schematic structural diagram of an auxiliary access apparatus according to an embodiment of this application. This specific embodiment of this application does not limit specific implementation of the auxiliary access apparatus. As shown in FIG. 6, the auxiliary access apparatus 600 may comprise:

a processor (processor) 610, a communications interface (Communications Interface) 620, a memory (memory) 630, and a communications bus 640.

The processor 610, the communications interface 620, and the memory 630 communicate with each other by using the communications bus 640.

The communications interface 620 is configured to communicate with a network element, for example, a client.

The processor 610 is configured to execute a program 632, and specifically may perform related steps in the method embodiment in FIG. 2.

Specifically, the program 632 may comprise program code, and the program code comprises a computer operation instruction.

The processor 610 may be a central processing unit CPU, an application specific integrated circuit ASIC (Application Specific Integrated Circuit), or one or more integrated circuits configured to implement the embodiments of this application.

The memory 630 is configured to store the program 632. The memory 630 may comprise a high-speed RAM memory, and may also comprise a non-volatile memory (non-volatile memory), for example, at least one magnetic disk storage. The program 632 may be specifically used to enable the auxiliary access apparatus 600 to perform the following steps:

sending at least two access-associated signals by using at least two non-coherent antennas; and receiving at least one access request.

For specific implementation of the steps in the program 632, reference may be made to corresponding descriptions of corresponding steps and units in the foregoing embodiments, and details are not described herein. It may be clearly understood by a person skilled in the art that, for the purpose of a convenient and brief description, for specific working processes of the foregoing devices and modules, reference may be made to corresponding process descriptions in the foregoing method embodiment, which are not described herein again.

It may be clearly understood by a person skilled in the art that, for the purpose of a convenient and brief description, for specific working processes of the foregoing devices and modules, reference may be made to corresponding descriptions in the foregoing apparatus embodiments, and details are not described herein again.

Although the subject described herein is provided in a general context with reference to that an operating system and an application program are executed in a computer system, a person skilled in the art may know that other implementation may further be executed with reference to a program module of another type. Generally, the program unit comprises a routine, a program, a component, a data structure, and a structure of another type for executing a particular task or implementing a particular abstract data type. A person skilled in the art may understand that the subject described herein may be practiced by using another configuration of a computer system, comprising a handheld device, a multi-processor system, a microprocessor-based or programmable consumer electronic product, a small computer, a mainframe computer, and the like, and may also be used in a distributed computing environment in which a task is fulfilled by a remote processing device connected by using a communications network. In a distributed computing environment, a program module may be located in either storage device of a local memory and a remote memory.

A person of ordinary skill in the art may be aware that, the exemplary units and method steps described in the embodiments disclosed in this specification may be implemented by electronic hardware, or a combination of computer software and the electronic hardware. Whether the functions are performed by hardware or software depends on particular applications and design constraint conditions of the technical solutions. A person skilled in the art may use different methods to implement the described functions for each particular application, but the implementation should not be construed as exceeding the scope of the present application.

When the functions are implemented in a form of a software functional unit, and are sold or used as an independent product, the functions may be stored in a computer readable storage medium. Based on such an understanding, the technical solutions of this application essentially, or the part contributing to the prior art, or a part of the technical solutions may be implemented in a form of a software product. The computer software product is stored in a storage medium and comprises several instructions for instructing a computer device (which may be a personal computer, a server, a network device, or the like) to perform all or a part of the steps of the method described in the embodiment of this application. The computer readable storage medium comprises physically volatile and non-volatile mediums and removable and irremovable mediums that are used to store information such as a computer readable instruction, a data structure, a program module, or other data and that are implemented by using any method or technology. The computer readable storage medium specifically comprises but is not limited to a USB flash drive, a removable hard disk, a read-only memory (ROM, Read-Only Memory), a random access memory (RAM, Random Access Memory), an erasable programmable read-only memory (EPROM), an electrically erasable programmable read-only memory (EEPROM), a flash memory or another solid-state storage technology, a CD-ROM, a digital versatile disc (DVD), an HD-DVD, a blu-ray (Blue-Ray) or another optical storage device, a magnetic tape, magnetic disk storage or other magnetic storage devices, or any other mediums that can be configured to store required information and that are accessible to a computer.

The foregoing implementation manners are only used for describing the present invention, and are not intended to limit the present invention. A person of ordinary skill in the art may make various changes and variations without departing from the spirit and scope of the present invention; therefore, any equivalent technical solution falls within the scope of the present invention, and patent protection scope of the present invention shall be defined by claims.

What is claimed is:

1. An access method, comprising:
   receiving access-associated signals from more than one transmission path corresponding to Directions of Arrivals, wherein the access-associated signals are separately sent by an access point device by using at least two non-coherent antennas, the at least two non-coherent antennas are two array elements that are spaced apart more than half of a wavelength;
   selecting, among the Directions of Arrivals, a direction of arrival as a transmission direction for an access request, wherein the selected direction of arrival was not previously used as a transmission path; and
   sending an access request in the transmission direction, wherein the access request is transmitted to the non-coherent antennas in the transmission path corresponding to the selected direction of arrival.

2. The method of claim 1, wherein the sending an access request comprises:
   sending the access request in the transmission direction of the access-associated signals from the more than one transmission path.

3. The method of claim 2, wherein the sending an access request comprises:
   arbitrarily determining the transmission direction of the access-associated signals from the more than one transmission path.

4. The method of claim 1, wherein the sending an access request comprises:
   determining at least one target direction of arrival in the Directions of Arrivals of the access-associated signals from the more than one transmission path according to at least received signal power of the received access-associated signals from the more than one transmission path; and
   sending the access request in the at least one target direction of arrival.

5. The method of claim 1, wherein the sending an access request comprises:
   determining at least one target direction of arrival in the Directions of Arrivals of the access-associated signals from the more than one transmission path according to at least a signal receiving delay of the received access-associated signals from the more than one transmission path; and
   sending the access request in the at least one target direction of arrival.

6. The method of claim 1, wherein the sending an access request comprises:
   determining, according to at least a spread spectrum signal characteristic of the received access-associated signals from the more than one transmission path, an antenna corresponding to the received access-associated signals from the more than one transmission path; and
   sending the access request in a direction of arrival corresponding to the determined antenna.

7. The method of claim 1, wherein the access-associated signals comprise: a cell-specific reference signal or a cell synchronization signal.

8. An access apparatus, comprising:
   a first receiving module, configured to receive access-associated signals from more than one transmission path corresponding to Directions of Arrivals, wherein the access-associated signals are separately sent by an access point device by using at least two non-coherent antennas, the at least two non-coherent antennas are two array elements that are spaced apart more than half of a wavelength; and
   a first sending module, configured to select, among the Directions of Arrivals, a direction of arrival as a transmission direction for an access request, wherein the selected direction of arrival was not previously used as a transmission path; and
   send an access request in the transmission direction, wherein the access request is transmitted to the non-coherent antennas in the transmission path corresponding to the selected direction of arrival.

9. The apparatus of claim 8, wherein the first sending module is configured to send the access request in the transmission direction of the access-associated signals from more than one transmission path.

10. The apparatus of claim 9, wherein the first sending module is configured to arbitrarily determine the transmission direction of the access-associated signals from the more than one transmission path.

11. The apparatus of claim 8, wherein the first sending module comprises:
    a second determining unit, configured to determine at least one target direction of arrival in the Directions of Arrivals of the access-associated signals from the more than one transmission path according to at least received signal power of the received access-associated signals from the more than one transmission path; and
    a second sending unit, configured to send the access request in the at least one target direction of arrival.

12. The apparatus of claim 8, wherein the first sending module comprises:
    a third determining unit, configured to determine at least one target direction of arrival in the Directions of Arrivals of the access-associated signals from the more than one transmission path according to at least a signal receiving delay of the received access-associated signals from the more than one transmission path; and
    a third sending unit, configured to send the access request in the at least one target direction of arrival.

13. The apparatus of claim 8, wherein the first sending module comprises:
    a fourth determining unit, configured to determine, according to at least a spread spectrum signal characteristic of the received access-associated signals from the more than one transmission path, an antenna corresponding to the received access-associated signals from the more than one transmission path; and a fourth sending unit, configured to send the access request in a direction of arrival corresponding to the determined antenna.

14. An access apparatus, comprising:
a transceiver;
a memory, configured to store an instruction; and
a processor, configured to execute the instruction stored by the memory, wherein the instruction enables the processor to perform operations including:
receiving access-associated signals from more than one transmission path corresponding to Directions of Arrivals by using the transceiver, wherein the access-associated signals are separately sent by an access point device by using at least two non-coherent antennas, the at least two non-coherent antennas are two array elements that are spaced apart more than half of a wavelength;
selecting, among the Directions of Arrivals, a direction of arrival as a transmission direction for an access request, wherein the selected direction of arrival was not previously used as a transmission path; and
sending an access request in the transmission direction, wherein the access request is transmitted to the non-coherent antennas in the transmission path corresponding to the selected direction of arrival.

* * * * *